United States Patent
Zhang

(10) Patent No.: US 11,836,841 B2
(45) Date of Patent: Dec. 5, 2023

(54) ANIMATION VIDEO PROCESSING METHOD AND APPARATUS, ELECTRONIC DEVICE, AND STORAGE MEDIUM

(71) Applicant: TENCENT TECHNOLOGY (SHENZHEN) COMPANY LIMITED, Guangdong (CN)

(72) Inventor: Tianxiang Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 104 days.

(21) Appl. No.: 17/687,008

(22) Filed: Mar. 4, 2022

(65) Prior Publication Data
US 2022/0189094 A1  Jun. 16, 2022

Related U.S. Application Data

(63) Continuation of application No. PCT/CN2021/076159, filed on Feb. 9, 2021.

(30) Foreign Application Priority Data

Feb. 10, 2020  (CN) .......................... 202010085370.5

(51) Int. Cl.
*G06T 13/40* (2011.01)
*G06V 20/40* (2022.01)
(Continued)

(52) U.S. Cl.
CPC .............. *G06T 13/40* (2013.01); *G06V 10/20* (2022.01); *G06V 20/46* (2022.01); *G06V 40/23* (2022.01); *G06T 2213/08* (2013.01)

(58) Field of Classification Search
CPC ..... G06T 13/40; G06T 2213/08; G06V 20/46; G06V 10/20; G06V 40/23
See application file for complete search history.

(56) References Cited

U.S. PATENT DOCUMENTS 6,587,574 B1 * 7/2003 Jeannin ................. G06F 16/786
345/949
10,388,053 B1  8/2019 Carter, Jr. et al.
(Continued)

FOREIGN PATENT DOCUMENTS

CN  108416013 A   8/2018
CN  109325456 A * 2/2019 ......... G06K 9/00335
(Continued)

OTHER PUBLICATIONS

Written Opinion for PCT/CN2021/076159, dated Apr. 28, 2021.
International Search Report for PCT/CN2021/076159, dated Apr. 28, 2021.

*Primary Examiner* — Terrell M Robinson
(74) *Attorney, Agent, or Firm* — Sughrue Mion, PLLC

(57) ABSTRACT

An animation video processing method and apparatus, an electronic device, and a storage medium. The method includes: determining an original animation video matching a target object; preprocessing the original animation video to obtain a key video frame in the original animation video and motion data corresponding to the key video frame; determining a motion data set matching the target object; determining a displacement parameter of the target object; and obtaining an animation video matching a real-time motion state of the target object based on the motion data set matching the target object and the displacement parameter of the target object. The present disclosure can accurately and efficiently obtain an animation video matching a real-time motion state of a target object in an original animation video.

18 Claims, 8 Drawing Sheets

(51) Int. Cl.
*G06V 10/20* (2022.01)
*G06V 40/20* (2022.01)

(56) References Cited

U.S. PATENT DOCUMENTS

| | | | | |
|---|---|---|---|---|
| 2012/0106869 | A1* | 5/2012 | Machitani | H04N 23/6811 |
| | | | | 382/284 |
| 2013/0219344 | A1* | 8/2013 | Zyracki | G06T 13/20 |
| | | | | 715/849 |
| 2019/0381404 | A1 | 12/2019 | Buttner | |
| 2020/0036952 | A1* | 1/2020 | Iwane | G06T 13/80 |
| 2020/0306643 | A1* | 10/2020 | Borovikov | A63F 13/79 |

FOREIGN PATENT DOCUMENTS

| | | |
|---|---|---|
| CN | 109325456 A | 2/2019 |
| CN | 109523613 A | 3/2019 |
| CN | 111298433 A | 6/2020 |

\* cited by examiner ary/076159, filed on Feb.
ANIMATION VIDEO PROCESSING METHOD AND APPARATUS, ELECTRONIC DEVICE, AND STORAGE MEDIUM

CROSS-REFERENCE TO RELATED APPLICATION(S)

This application is a continuation application of International Application No. PCT/CN2021/076159, filed on Feb. 9, 2021, which claims priority to Chinese Patent Application No. 202010085370.5, filed with the China National Intellectual Property Administration on Feb. 10, 2020, the disclosures of which are incorporated by reference in their entireties.

FIELD

The present disclosure relates to information processing technologies, and in particular, to an animation video processing method and apparatus, an electronic device, and a storage medium.

BACKGROUND

Artificial intelligence (AI) characters are computer-controlled (rather than user-controlled) game characters in a game scene. For example, in some massively multiplayer online role-playing games (MMORPGs), AI characters are commonly seen.

An AI character can move freely in the game scene like user-controlled game characters and support animation, sound effects, and other functions, and a location thereof can be accurately synchronized by a server to each client. In addition, the behavior logic of the AI character is controlled by a behavior tree, and the behavior thereof can be configured by AI planning.

In a conventional solution, during processing of an AI character, an animation state machine is less scalable when facing complex motion behaviors. Similarly, in order to cover various motion behaviors of the character, a motion matching algorithm requires recording of a large amount of motion capture data as the data basis, so as to ensure that relatively close animation clips can be found regardless of the motion state. This process takes a large amount of system overheads and affects user experience.

SUMMARY

In view of this, embodiments of the present disclosure may provide an animation video processing method and apparatus, an electronic device, and a storage medium. Technical solutions of the embodiments of the present disclosure are implemented as follows:

According to an aspect, an example embodiment of the present disclosure may provide an animation video processing method, including:
determining an original animation video matching a target object, the original animation video being used for representing motion states of the target object in different usage scenarios;
preprocessing the original animation video to obtain a key video frame in the original animation video and motion data corresponding to the key video frame;
determining, according to the motion data corresponding to the key video frame, a motion data set matching the target object;
determining a displacement parameter of the target object based on a real-time motion state of the target object; and
obtaining an animation video matching a real-time motion state of the target object based on the motion data set matching the target object and the displacement parameter of the target object.

An example embodiment of the present disclosure may further provide an animation video processing apparatus, including:
an information transmission module, configured to determine an original animation video matching a target object, the original animation video being used for representing motion states of the target object in different usage scenarios; and
an information processing module, configured to preprocess the original animation video to obtain a key video frame in the original animation video and motion data corresponding to the key video frame;
the information processing module being configured to determine, according to the motion data corresponding to the key video frame, a motion data set matching the target object;
the information processing module being configured to determine a displacement parameter of the target object based on a real-time motion state of the target object; and
the information processing module being configured to obtain an animation video matching the real-time motion state of the target object based on the motion data set matching the target object and the displacement parameter of the target object.

In an example embodiment of the disclosure, based on the foregoing solution, the information processing module is configured to determine an animation video output environment corresponding to the target object; the information processing module is configured to determine motion states of the target object in different usage scenarios according to the animation video output environment; and the information processing module is configured to dynamically capture motion actions of a captured object according to the motion states of the target object in different usage scenarios, to form the original animation video matching the target object.

In an example embodiment of the disclosure, based on the foregoing solution, the information processing module is configured to detect limb drop point positions of the target object in all video frames in the original animation video; and the information processing module is configured to: when the limb drop point positions of the target object are located in a corresponding horizontal plane, or are in contact with a corresponding reference object, determine that a video frame comprising the limb drop point positions of the target object is the key video frame; and the information processing module is configured to determine, based on the key video frame, that displacement parameters of the target object in different usage scenarios are used as the motion data corresponding to the key video frame. One of ordinary skill will understand that use of the word "when" in describing this and other example embodiments is intended to reflect a condition precedent as opposed to an exact temporal requirement.

In an example embodiment of the disclosure, based on the foregoing solution, the information processing module is configured to determine, when limbs of the target object are a left lower limb and a right lower limb of the target object, a velocity of the left lower limb of the target object and a velocity of the right lower limb of the target object; and the information processing module is configured to determine, when a difference between the velocity of the left lower limb of the target object and the velocity of the right lower limb of the target object reaches a negative extreme, that a position of the left lower limb of the target object is located in the corresponding horizontal plane; and the information processing module is configured to determine, when the difference between the velocity of the left lower limb of the target object and the velocity of the right lower limb of the target object reaches a positive extreme, that a position of the right lower limb of the target object is located in the corresponding horizontal plane.

In an example embodiment of the disclosure, based on the foregoing solution, the information processing module is configured to determine, when limbs of the target object are a left upper limb and a right upper limb the target object, a velocity of the left upper limb of the target object and a velocity of the right upper limb of the target object; and the information processing module is configured to determine, when a difference between the velocity of the left upper limb of the target object and the velocity of the right upper limb of the target object reaches a negative extreme, that a position of the left upper limb of the target object is in contact with the corresponding reference object; or the information processing module is configured to determine, when a difference between the velocity of the left upper limb of the target object and the velocity of the right upper limb of the target object reaches a positive extreme, that a position of the right upper limb of the target object is in contact with the corresponding reference object.

In an example embodiment of the disclosure, based on the foregoing solution, the information processing module is configured to determine a movement path of the target object based on a pathfinding algorithm process; the information processing module is configured to determine a maximum displacement parameter matching the target object and a corresponding maximum plus displacement parameter according to the motion data set matching the target object; and the information processing module is configured to determine displacement parameters of the target object at different moments according to the movement path of the target object, the maximum displacement parameter matching the target object, and the corresponding maximum plus displacement parameter.

In an example embodiment of the disclosure, based on the foregoing solution, the information processing module is configured to determine a first motion vector corresponding to a current motion state of the target object based on the displacement parameter of the target object; the information processing module is configured to determine a second motion vector corresponding to each key video frame based on the motion data set matching the target object; the information processing module is configured to determine, according to the first motion vector, a second motion vector matching the first motion vector in a search binary tree structure corresponding to the second motion vector; and the information processing module is configured to determine a corresponding key video frame according to the second motion vector matching the first motion vector, and obtain the animation video matching the real-time motion state of the target object through the determined key video frame.

In an example embodiment of the disclosure, based on the foregoing solution, the information processing module is configured to: when the first motion vector represents that a left lower limb of the target object is located in a corresponding horizontal plane, determine the second motion vector matching the first motion vector through a right lower limb search binary tree structure corresponding to the second motion vector; or the information processing module is configured to: when the first motion vector represents that a right lower limb of the target object is located in a corresponding horizontal plane, determine the second motion vector matching the first motion vector through a left lower limb search binary tree structure corresponding to the second motion vector.

In an example embodiment, based on the foregoing solution, the information processing module is configured to determine, according to the key video frame, different animation videos to be output; and the information processing module is configured to determine, in the different animation videos to be output, that an animation video to be output in which a limb drop point position of the target object has a minimum distance with a current limb drop point position of the target object is the animation video matching the real-time motion state of the target object.

In an example embodiment, based on the foregoing solution, the information processing module is configured to obtain target resolution corresponding to the animation video output environment; and the information processing module is configured to perform resolution enhancement processing on the animation video matching the real-time motion state of the target object based on the target resolution, so that the animation video matching the real-time motion state of the target object matches the animation video output environment.

An example embodiment of the present disclosure may further provide an electronic device, including:
a memory, configured to store executable instructions; and a processor, configured to run the executable instructions stored in the memory, to implement the animation video processing method described above.

An example embodiment of the present disclosure may further provide a non-transitory computer-readable storage medium, storing executable instructions, the executable instructions, when executed by a processor, implementing the animation video processing method described above.

In the technical solutions shown in the embodiments of the present disclosure, an original animation video matching a target object is determined, the original animation video being used for representing motion states of the target object in different usage scenarios; the original animation video is preprocessed to obtain a key video frame in the original animation video and motion data corresponding to the key video frame; a motion data set matching the target object is determined according to the motion data corresponding to the key video frame; a displacement parameter of the target object is determined based on a real-time motion state of the target object; and an animation video matching the real-time motion state of the target object is obtained based on the motion data set matching the target object and the displacement parameter of the target object. In this way, an animation video matching a real-time motion state of a target object can be accurately and efficiently obtained in an original animation video. Compared with the conventional technology, the present disclosure supports a much larger quantity of AI characters and much higher animation quality while ensuring that an information processing capability of an electronic device of a user remains unchanged, thereby effectively improving user experience.

It is to be understand that the foregoing general descriptions and the following detailed descriptions are merely for illustration and explanation purposes and are not intended to limit the disclosure.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
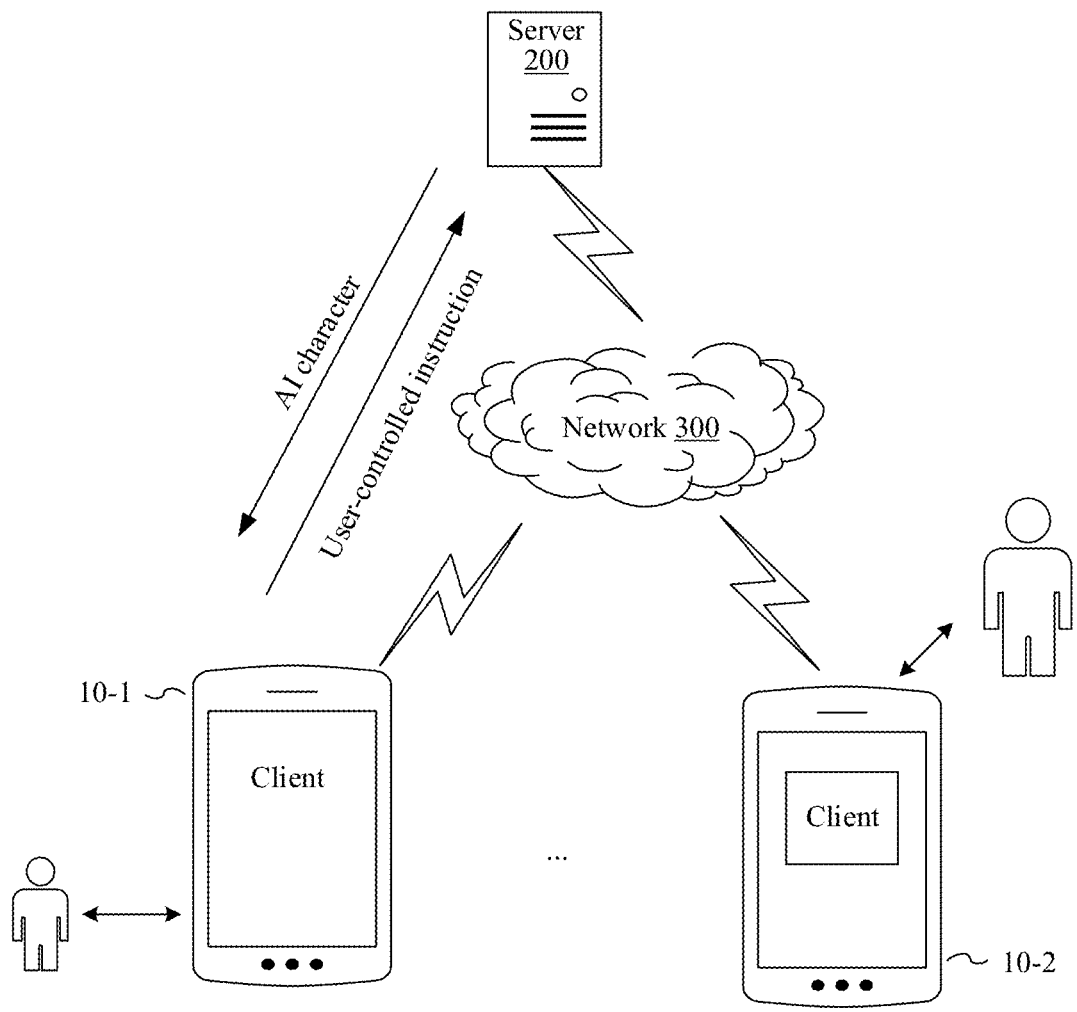
FIG. 1 is a schematic diagram of a usage scenario of an animation video processing method according to an example embodiment of the present disclosure.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

Before the embodiments of the present disclosure are further described in detail, nouns and terms involved in the embodiments of the present disclosure are described. The nouns and terms provided in the embodiments of the present disclosure are applicable to the following explanations.

1) "In response to" is used for representing a condition or status on which one or more operations to be performed depend. When the condition or status is satisfied, the one or more operations may be performed immediately or after a set delay. Unless explicitly stated, there is no limitation on the order in which the plurality of operations are performed.

2) Terminal: including but not limited to a common terminal and a dedicated terminal, where the common terminal maintains a persistent connection and/or a short connection to a transmit channel, and the dedicated terminal maintains a persistent connection to the transmit channel.

3) A client is a carrier for implementing a specific function in a terminal. For example, a mobile client (APP) is a carrier of a specific function in a mobile terminal, for example, to perform a function of payment and consumption or a function of purchasing a financial product.

4) A virtual environment is displayed (or provided) by an application program when run on a terminal. The virtual environment may be a simulated environment of a real world, or may be a semi-simulated semi-fictional three-dimensional (3D) environment, or may be an entirely fictional 3D environment. The virtual environment may be any one of a two-dimensional virtual environment, a 2.5-dimensional virtual environment, and a 3D virtual environment. Description is made by using an example in which the virtual environment is a 3D virtual environment in the following embodiment, but this is not limited. Optionally, the virtual environment is further used for a virtual environment battle between at least two virtual objects. Optionally, the virtual environment is further used for a battle performed between at least two virtual objects by using virtual guns. Optionally, the virtual environment is further used for a battle performed between at least two virtual objects by using virtual guns in a range of a target region, and the range of the target region may be continuously decreased as time goes by in the virtual environment.

(5) Virtual props refer to virtual weapons that attack by shooting bullets in a virtual environment, or virtual bows and virtual slingshots that shoot arrow clusters. A virtual object may pick up a virtual gun in the virtual environment, and attack by using the virtual gun obtained through picking-up.

In an example embodiment, the virtual object may be a user virtual object controlled by an operation on a client, or may be AI configured in a virtual scene battle through training, or may be a non-user virtual object (or non-player character, NPC) configured in an interaction in a virtual scene. For example, the virtual object may be a virtual character competing in a virtual scene. A quantity of virtual objects participating in the interaction in the virtual scene may be preset or dynamically determined according to a quantity of clients participating in the interaction.

For example, in a shooting game, a user may control a virtual object to descend freely, glide, parachute, or the like in the sky of the virtual scene, or run, jump, crawl, stoop to move forward, or the like on the land, or swim, float, dive, or the like in the ocean. The user may alternatively control the virtual object to drive a virtual vehicle to move in the virtual scene. For example, the virtual vehicle may be a virtual car, a virtual aircraft, or a virtual yacht. Herein, the foregoing scene is merely used as an example for description, which is not specifically limited in the embodiments of the present disclosure. The user may alternatively control the virtual object to fight against another virtual object with a virtual weapon. The virtual weapon may be a cold weapon or a hot weapon, which is not specifically limited in the present disclosure.

(6) An AI character is a non-player character in a game, such as an enemy (which may be machine-controlled) or a character in the game controlled by a teammate.

(7) An animation state machine is a technical means to drive animation performance of characters with different states and transitions there between.

(8) A motion state (locomotion) includes basic motion behaviors such as walking, running, and turning of a game target object (game character).

(9) A motion capture technology is to record a motion state of a real game character through a sensor and transform the recorded motion state into animation data.

(10) Motion matching is a technology that uses a large amount of motion capture data to drive a character animation.

(11) A synchronization point (sync point) technology is to mark a synchronization point on an animation (generally a moment at which a left/right foot is on the ground) to ensure that positions of feet roughly match during switching between two animations.

(12) A k-dimensional (KD) tree is a tree-like data structure of a binary tree and may be used for quickly finding a nearest neighbor target of specified coordinates in a large amount of data.

(13) A Euclidean distance is a way to measure a distance between two coordinates, and a calculation method is to square a coordinate difference of each space dimension, add the results, and then calculate a square root of the sum. The Euclidean distance corresponds to a physical distance between two points in the three-dimensional space.

A method provided in the present disclosure may be applied to a virtual reality (VR) application program, a three-dimensional map program, a military simulation program, an FPS game, a multiplayer online battle arena (MOBA) game, and the like. An application in a game is used as an example for description in the following embodiments.

A game based on a virtual environment usually includes maps of one or more game worlds. The virtual environment in the game simulates scenes in the real world. A user may control a virtual object in the game to perform actions in the virtual environment such as walking, running, jumping, shooting, combatting, driving, switching to virtual weapons, and using a virtual weapon to attack another virtual object, which has relatively high interactivity. In addition, a plurality of users may form a team online to perform an arena game. When the user controls the virtual object to launch an attack on a target virtual object using a virtual weapon, the user needs to move (for example, run or climb) according to a position of the target virtual object. Similarly, an AI character in the game also needs to move in a game interface.

An FPS game is a shooting game in which a user can play from a first-person perspective. A virtual environment picture in the game is a picture of observing a virtual environment from the perspective of a first virtual object. In the game, at least two virtual objects play in a single-round battle mode in the virtual environment. The virtual object escapes attacks by other virtual objects and dangers (such as a poison gas area and a swamp) in the virtual environment to survive in the virtual environment. When the hit point of the virtual object in the virtual environment is zero, the life of the virtual object in the virtual environment ends, and the final virtual object surviving in the virtual environment wins. For example, a battle starts with a moment when a first client joins the battle, and ends with a moment when the last client exits the battle. Each client may control one or more virtual objects in the virtual environment. Arena modes of the battle may include a single-player battle mode, a two-player team battle mode, or a multi-player team battle mode. The battle mode is not limited in the embodiments of the present disclosure.

FIG. 1 is a schematic diagram of a usage scenario of an animation video processing method according to an embodiment of the present disclosure. Referring to FIG. 1, terminals (including a terminal 10-1 and a terminal 10-2) are each provided with a client capable of displaying corresponding animation video processing software, such as clients or plug-ins for different game. A user can obtain and display animation video processing through a corresponding client, and trigger a corresponding animation video processing process (such as running or climbing in different sports routes) during running of the game process. The terminals are connected to a server 200 by using a network 300, and the network 300 may be a wide area network, a local area network, or a combination of the wide area network and the local area network, and achieves data transmission by using a radio link.

In an example, the server 200 is configured to deploy an animation video processing apparatus to implement an animation video processing method provided in the present disclosure. The method includes: determining an original animation video matching a target object, the original animation video being used for representing motion states of the target object in different usage scenarios; preprocessing the original animation video to obtain a key video frame in the original animation video and motion data corresponding to the key video frame; determining, according to the motion data corresponding to the key video frame, a motion data set matching the target object; determining a displacement parameter of the target object based on a real-time motion state of the target object; and obtaining an animation video matching the real-time motion state of the target object based on the motion data set matching the target object and the displacement parameter of the target object.

The animation video processing apparatus provided in the present disclosure may be applied to different game environments, including but not limited to, virtual reality applications, three-dimensional map programs, military simulation programs, first-person shooter (FPS) games, multiplayer online battle arena (MOBA) games, and the like, and finally present and control corresponding virtual props in a user interface (UI). Motion data (such as running or attacking in a virtual environment) of a user in a current display interface may also be called by other applications.

The animation video processing apparatus that processes different animation videos to obtain an animation video matching a real-time motion state of a target object specifically includes: determining an original animation video matching a target object, the original animation video being used for representing motion states of the target object in different usage scenarios; preprocessing the original animation video to obtain a key video frame in the original animation video and motion data corresponding to the key video frame; a motion data set matching the target object is determined according to the motion data corresponding to the key video frame; determining a displacement parameter of the target object based on a real-time motion state of the target object; and obtaining an animation video matching the real-time motion state of the target object based on the motion data set matching the target object and the displacement parameter of the target object.

Figure 2:
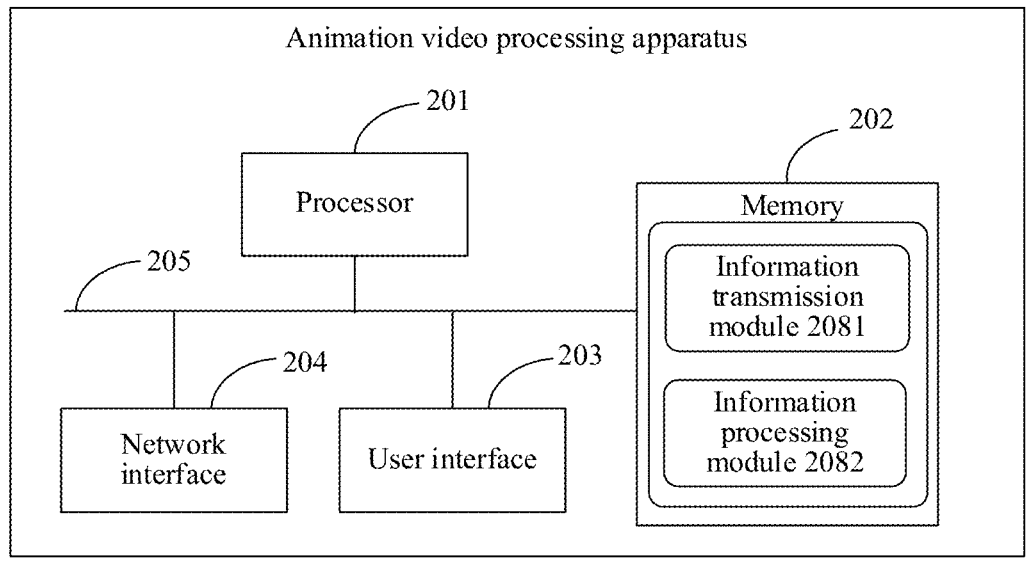
FIG. 2 is a schematic structural diagram of an electronic device according to an example embodiment of the present disclosure.

A structure of the animation video processing apparatus of the embodiments of the present disclosure is described in detail below. The animation video processing apparatus may be implemented in various forms, such as a dedicated terminal with a processing function of an animation video processing apparatus, or an electronic device (a mobile phone or a tablet computer) provided with a processing function of an animation video processing apparatus, such as the terminal 10-1 or the terminal 10-2 in FIG. 1. FIG. 2 is a schematic structural diagram of composition of an electronic device according to an embodiment of the present disclosure. It may be understood that, FIG. 2 shows only an exemplary structure rather than a complete structure of the animation video processing apparatus. The structure shown in FIG. 2 may be partially or entirely implemented based on requirements.

The animation video processing apparatus provided in this embodiment of the present disclosure includes: at least one processor 201, a memory 202, a user interface 203, and at least one network interface 204. Various components in the animation video processing apparatus are coupled together by a bus system 205. It may be understood that the bus system 205 is configured to implement connection and communication between the components. In addition to a data bus, the bus system 205 further includes a power bus, a control bus, and a state signal bus. However, for ease of clear description, all types of buses are labeled as the bus system 205 in FIG. 2.

The user interface 203 may include a display, a keyboard, a mouse, a track ball, a click wheel, a key, a button, a touch panel, a touchscreen, or the like.

The memory 202 in this embodiment of the present disclosure can store data to support operations of a terminal (for example, 10-1). An example of the data includes any computer program to be operated on the terminal (for example, 10-1), for example, an operating system and an application program. The operating system includes various system programs, such as framework layers, kernel library layers, and driver layers used for implementing various basic services and processing hardware-based tasks. The application program may include various application programs.

In some embodiments, the animation video processing apparatus provided in the embodiments of the present disclosure may be implemented in the form of a combination of software and hardware. In an example, the animation video processing apparatus provided in the embodiments of the present disclosure may be a processor in the form of a hardware decoding processor, and is programmed to execute the animation video processing method provided in the embodiments of the present disclosure. For example, the processor in the form of a hardware decoding processor may use one or more ASICs, digital signal processor (DSP), programmable logic devices (PLDs), complex programmable logic device (CPLD), FPGAs, or other electronic elements.

For example, the animation video processing method provided in this embodiment of the present disclosure is implemented by a combination of software and hardware. The animation video processing apparatus provided in this embodiment of the present disclosure may be directly embodied as a combination of software modules executed by the processor 201. The software module may be located in a storage medium, the storage medium is located in the memory 202, and the processor 201 reads executable instructions included in the software module in the memory 202, and implements, in combination with necessary hardware (for example, including a processor 201 and another component connected to the bus 205), the animation video processing method provided in the embodiments of the present disclosure.

For example, the processor 201 may be an integrated circuit chip, and has a signal processing capability, for example, a general-purpose processor, a digital signal processor (DSP), or another programmable logical device, a discrete gate or a transistor logical device, or a discrete hardware component. The general-purpose processor may be a microprocessor, any conventional processor, or the like.

In an example in which the animation video processing apparatus provided in the embodiments of the present disclosure is implemented by hardware, the apparatus provided in the embodiments of the present disclosure may be directly executed by using the processor 201 in the form of a hardware decoding processor, for example, one or more ASICs, DSPs, PLDs, CPLDs, FPGAs, or other electronic elements, to execute the animation video processing method provided in the embodiments of the present disclosure.

The memory 202 in the embodiments of the present disclosure is configured to store various types of data to support operation of the animation video processing apparatus. Examples of these types of data include any executable instruction to be operated on the animation video processing apparatus, for example, an executable instruction. A program for implementing the animation video processing method of the embodiment of the present disclosure may be included in the executable instruction.

In some other embodiments, the animation video processing apparatus provided in the embodiments of the present disclosure may be implemented in the form of software. FIG. 2 shows an animation video processing apparatus stored in the memory 202, which may be software in the form of a program, a plug-in, or the like, and include a series of modules. An example of the program stored in the memory 202 may include the animation video processing apparatus. The animation video processing apparatus includes the following software modules: an information transmission module 2081 and an information processing module 2082. When the software modules in the animation video processing apparatus are read by the processor 201 into a RAM and executed, the animation video processing method provided in the embodiments of the present disclosure is implemented. Functions of the software modules in the animation video processing apparatus are as follows:

An information transmission module 2081 is configured to determine an original animation video matching a target object, the original animation video being used for representing motion states of the target object in different usage scenarios.

An information processing module 2082 is configured to preprocess the original animation video to obtain a key video frame in the original animation video and motion data corresponding to the key video frame. Here, preprocessing may include the process of reducing or filtering the video frames in the original animation video to obtain a key video frame.

The information processing module 2082 is configured to determine, according to the motion data corresponding to the key video frame, a motion data set matching the target object.

The information processing module 2082 is configured to determine a displacement parameter of the target object based on a real-time motion state of the target object.

The information processing module 2082 is configured to obtain an animation video matching the real-time motion state of the target object based on the motion data set matching the target object and the displacement parameter of the target object.

Figure 3:
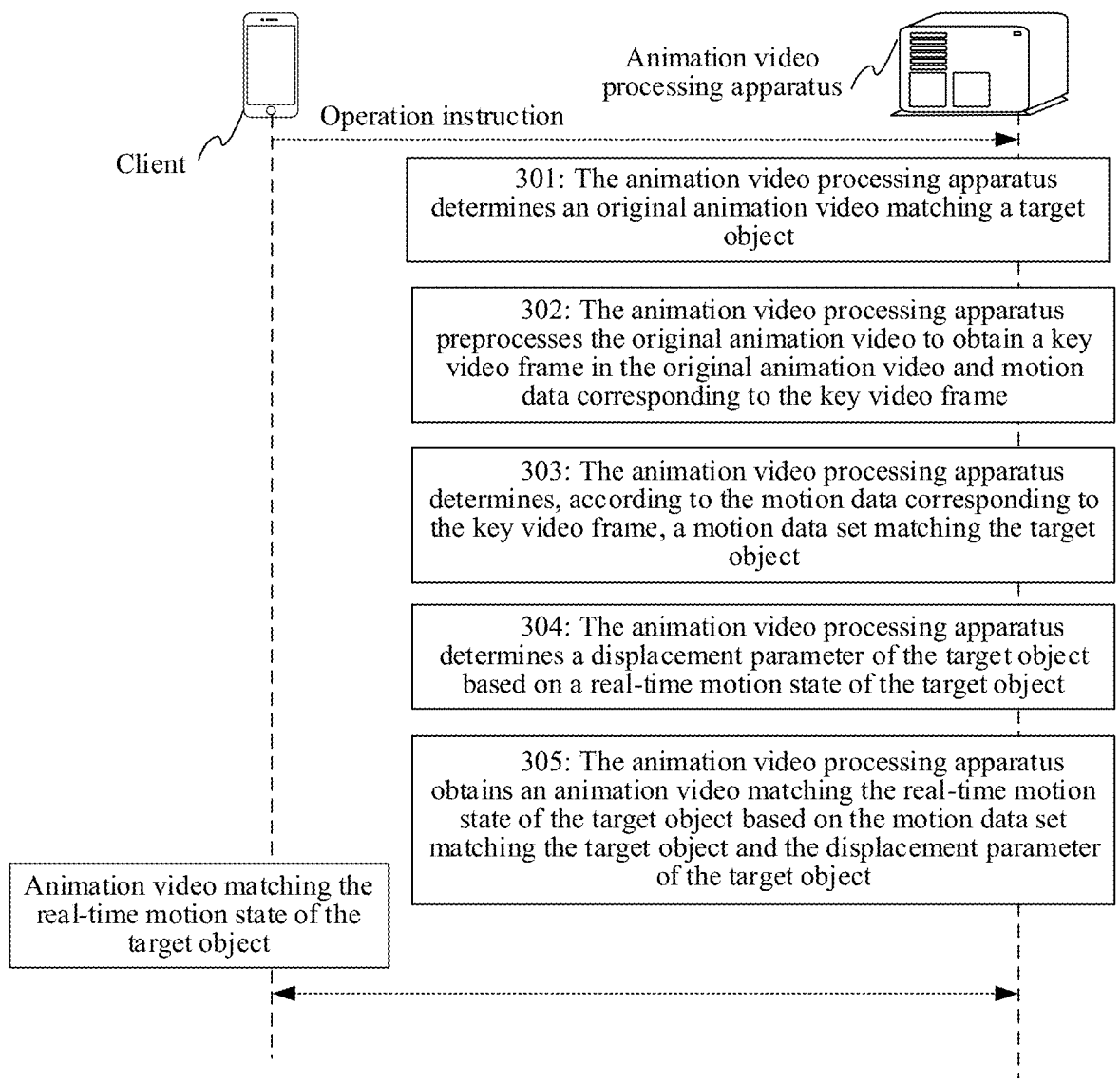
FIG. 3 is a schematic flowchart of an animation video processing method according to an example embodiment of the present disclosure.

The animation video processing method provided in the embodiments of the present disclosure is described with reference to the animation video processing apparatus shown in FIG. 2. FIG. 3 is a schematic flowchart of an animation video processing method according to an example embodiment of the present disclosure. It may be understood that, operations shown in FIG. 3 may be performed by various electronic devices each running an animation video processing apparatus, such as various game devices each with an animation video processing apparatus. A dedicated terminal with an animation video processing apparatus may be encapsulated in the terminal 10-1 shown in FIG. 1, to execute the corresponding software module in the animation video processing apparatus shown in FIG. 2. The following describes the operations shown in FIG. 3.

Operation 301: An animation video processing apparatus determines an original animation video matching a target object.

The original animation video is used for representing motion states of the target object in different usage scenarios. The different usage scenarios involved in this embodiment of the present disclosure include, but are not limited to: a 2D video game scene, a 3D exergaming video game scene, and a virtual reality interactive usage scenario.

In some embodiments of the present disclosure, the target object may be a movable object in different usage scenarios. The scenario may be a 2D usage scenario or a 3D usage scenario. Using a game scene as an example, the game scene is a virtual scene created in a game match process for game characters to compete in the game, such as a virtual house, a virtual island, or a virtual map. The target object may be a game character in the game scene, such as a player-controlled game character or a computer-controlled AI character. In some other examples, the target object may alternatively be a movable object in the game scene other than the game character, such as a monster, a vehicle, a ship, a flying object, or any other movable object.

In some embodiments of the present disclosure, the determining an original animation video matching a target object may be implemented in the following manner:

determining an animation video output environment corresponding to the target object; determining motion states of the target object in different usage scenarios according to the animation video output environment; and dynamically capturing motion actions of a captured object according to the motion states of the target object in different usage scenarios, to form the original animation video matching the target object. With reference to FIG. 1, the terminals (including the terminal 10-1 and the terminal 10-2) are each provided with a client with software capable of displaying a corresponding AI character, such as clients or plug-ins for different game. A user can obtain the AI character, interact with a user-controlled character, and present the interaction through a corresponding client, and trigger a corresponding animation video processing process (for example, a virtual object can run or attack in a virtual environment) during virtual resource changes. Coverage of different motion behaviors of the character through motion capture data to form the original animation video matching the target object can ensure integrity of the coverage of the different motion behaviors of the character.

Operation 302: The animation video processing apparatus preprocesses the original animation video to obtain a key video frame in the original animation video and motion data corresponding to the key video frame.

In some embodiments of the present disclosure, the preprocessing of the original animation video to obtain a key video frame in the original animation video and motion data corresponding to the key video frame may be implemented in the following manner:

detecting limb drop point positions of the target object in all video frames in the original animation video; and when the limb drop point positions of the target object are located in a corresponding horizontal plane, or when the limb drop point positions of the target object are in contact with a corresponding reference object, determining that a video frame including the limb drop point positions of the target object is the key video frame; and determining, based on the key video frame, that displacement parameters of the target object in different usage scenarios are used as the motion data corresponding to the key video frame. For example, in a game scene, an AI character moves along a path calculated in advance according to a pathfinding algorithm. A motion track generated by the pathfinding algorithm is generally a folded segment instead of an arc. A motion pattern of the AI character is relatively simple and can be divided into motion animation videos in different directions, for example, start walking animation videos or start running animation videos in eight directions (forward and backward, left and right, front left, front right, back left, and back right), or turning animation videos or sudden stop animation videos in eight directions during running, which can cover all motion states of the AI character.

Figure 4:
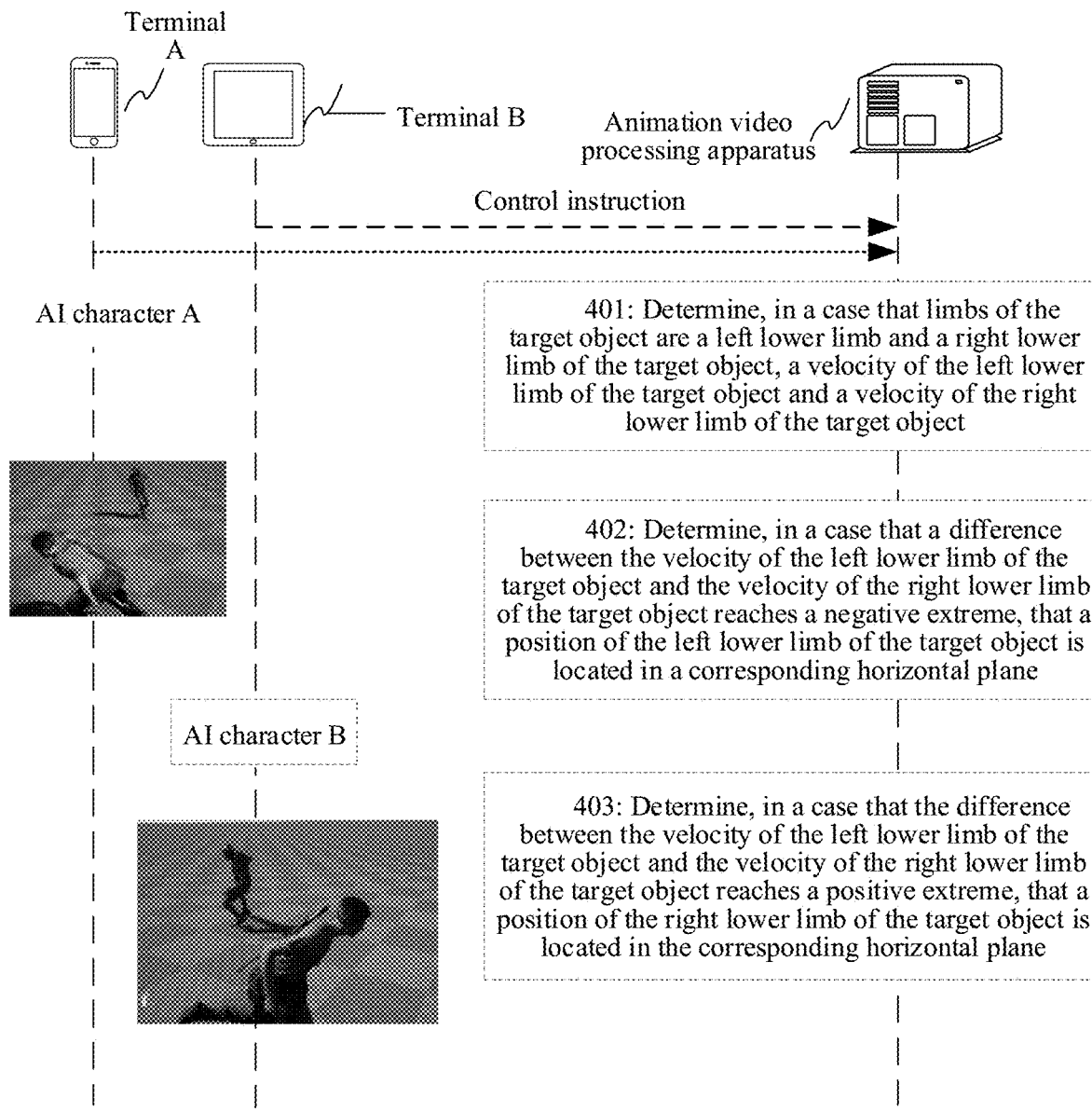
FIG. 4 is a schematic flowchart of an animation video processing method according to an example embodiment of the present disclosure.

The animation video processing method provided in the embodiments of the present disclosure is still described with reference to the animation video processing apparatus shown in FIG. 2. FIG. 4 is a schematic flowchart of an animation video processing method according to an example embodiment of the present disclosure. It may be understood that, operations shown in FIG. 4 may be performed by various electronic devices each running an animation video processing apparatus, such as various game devices each with an animation video processing apparatus. A dedicated terminal with an animation video processing apparatus may be encapsulated in the terminal 10-1 shown in FIG. 1, to execute the corresponding software module in the animation video processing apparatus shown in FIG. 2. The following describes the operations shown in FIG. 4.

Operation 401: Determine, when limbs of the target object are a left lower limb and a right lower limb, a velocity of the left lower limb of the target object and a velocity of the right lower limb of the target object.

Operation 402: Determine, when a difference between the velocity of the left lower limb of the target object and the velocity of the right lower limb of the target object reaches a negative extreme, that a position of the left lower limb of the target object is located in a corresponding horizontal plane.

Operation 403: Determine, when the difference between the velocity of the left lower limb of the target object and the velocity of the right lower limb of the target object reaches a positive extreme, that a position of the right lower limb of the target object is located in the corresponding horizontal plane.

Using running of an AI character in a game environment as an example, during the running, a left lower limb (a left foot) and a right lower limb (a right foot) of the AI character alternately land on the ground constantly. During the movement, a velocity of a support foot drops to 0 after landing while the other foot has a positive velocity. Therefore, when the two feet alternately become the support foot, a velocity difference between the two changes in waves between the negative extreme and the positive extreme. When a difference between a velocity of the left foot of the target object and a velocity of the right foot of the target object reaches the negative extreme, the left foot of the target object has landed. Therefore, a video frame within the video frames in which the left foot of the target object has landed is the key video frame.

In some embodiments of the present disclosure, the detecting limb drop point positions of the target object in all video frames in the original animation video may be implemented in the following manner:

determining, when limbs of the target object are a left upper limb and a right upper limb, a velocity of the left upper limb of the target object and a velocity of the right upper limb of the target object; and determining, when a difference between the velocity of the left upper limb of the target object and the velocity of the right upper limb of the target object reaches a negative extreme, that a position of the left upper limb of the target object is in contact with the corresponding reference object; or determining, when a difference between the velocity of the left upper limb of the target object and the velocity of the right upper limb of the target object reaches a positive extreme, that a position of the right upper limb of the target object is in contact with the corresponding reference object.

Using rock climbing of an AI character in a game environment as an example, during the rock climbing, a left upper limb (a left hand) and a right upper limb (a right hand) of the AI character alternately comes in contact with the mountain rock as a reference object constantly. During the movement, a velocity of a support hand remains unchanged while the other hand has a positive velocity. Therefore, when the two hands alternately become a support point, a velocity difference between the two changes in waves between the negative extreme and the positive extreme. When a difference between a velocity of the left hand of the target object and a velocity of the right hand of the target object reaches the negative extreme, the left hand of the target object has remained in contact with the mountain rock as the support point. Therefore, a video frame within the video frames in which the left hand of the target object has been in contact with the reference object is the key video frame.

Operation 303: The animation video processing apparatus determines, according to the motion data corresponding to the key video frame, a motion data set matching the target object.

Operation 304: The animation video processing apparatus determines a displacement parameter of the target object based on a real-time motion state of the target object.

In some embodiments of the present disclosure, the determining a displacement parameter of the target object based on a real-time motion state of the target object may be implemented in the following manner:

determining a movement path of the target object based on a pathfinding algorithm process; determining a maximum displacement parameter matching the target object and a corresponding maximum plus displacement parameter according to the motion data set matching the target object; and determining displacement parameters of the target object at different moments according to the movement path of the target object, the maximum displacement parameter matching the target object, and the corresponding maximum plus displacement parameter.

In some embodiments of the present disclosure, a planned movement path of the target object in the scene is a movement path planned according to start and end positions (including a start position and an end position) of the target object by using an automatic pathfinding algorithm. The planned movement path is not necessarily an actual movement path, because during actual movement in the scene, the target object may encounter some obstacles (such as walls, steps, stones, and other static obstacles, or other objects in the scene, movable objects, and other dynamic obstacles). These obstacles block the target object from moving along the planned movement path. The target object continues to move to the end position after bypassing the obstacles. In addition, static obstacles are avoided during generation of the planned movement path. Therefore, there are no static obstacles on the planned movement path. However, during actual movement of the target object, due to collision and extrusion with other objects, the target object may sometimes slightly deviate from the planned movement path, resulting in a possible collision with the static obstacles in the scenario. The start and end positions of the target object may be determined by the user or the server. For example, when the target object is an AI character in the game scene, both the start and end positions of the target object and the planned movement path can be determined by the server. For example, the target object is an AI character in the game. A movement speed of an AI character is usually at the same order of magnitude as a movement speed of a player-controlled game character, and the AI character does not transiently move frequently. This means that positions of the AI character between two frames are close enough. For example, assuming that a refresh rate is 60 frames per second and the movement speed of the AI character is 10 meters per second, a difference between the positions of the AI character between the two frames is only approximately 0.16 m, which is much smaller than a scale of the entire scene.

Operation 305: The animation video processing apparatus obtains an animation video matching the real-time motion state of the target object based on the motion data set matching the target object and the displacement parameter of the target object.

In some embodiments of the present disclosure, the motion data set may include motion state data of the same AI character in different postures, and may also include motion data of the same AI character in the same motion posture in different virtual environments. With reference to the embodiment shown in FIG. 2, using an FPS 3D game as an example, the terminal can control the AI character to move or perform certain actions on the land of the virtual interaction scene; or can also control the AI character to move or perform certain actions in a virtual environment such as a shoal, a swamp, or a mountain stream. The movement of the AI character in the land may be running, jumping, crawling, bending forward on the land, or the like. The AI character in different virtual environments has different motion data in the same motion posture (for example, the same AI character has different running velocities on the land, shoal, swamp, or mountain stream). Therefore, velocity parameters of the target object in the virtual environment may be further determined as the motion data corresponding to the key video frame, to improve user experience of the user controlling the AI character as the target object to move in different virtual environments.

Figure 5:
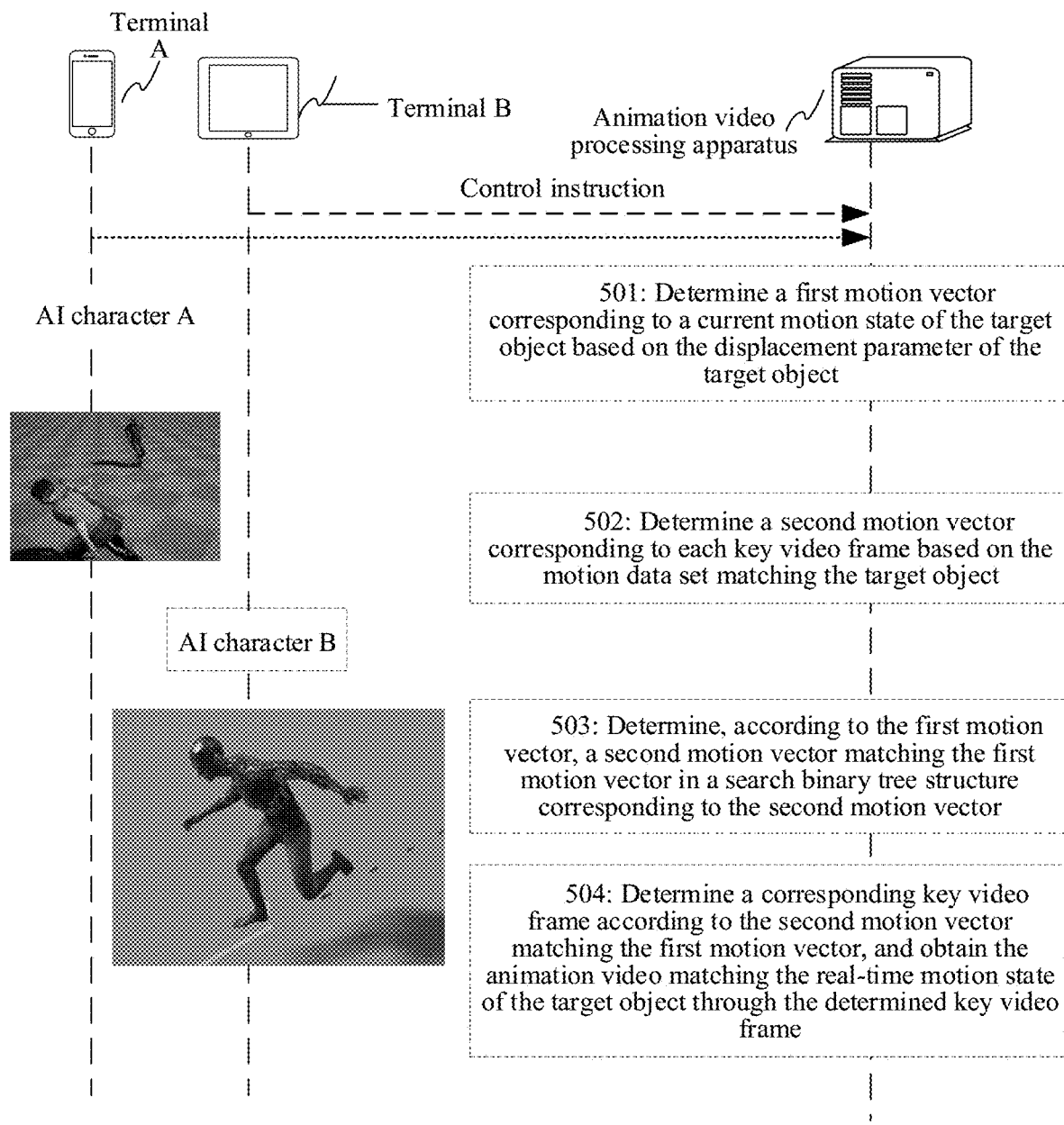
FIG. 5 is a schematic flowchart of an animation video processing method according to an example embodiment of the present disclosure.

The animation video processing method provided in the embodiments of the present disclosure is still described with reference to the animation video processing apparatus shown in FIG. 2. FIG. 5 is a schematic flowchart of an animation video processing method according to an example embodiment of the present disclosure. It may be understood that, operations shown in FIG. 5 may be performed by various electronic devices each running an animation video processing apparatus, such as various game devices each with an animation video processing apparatus. A dedicated terminal with an animation video processing apparatus may be encapsulated in the terminal 10-1 shown in FIG. 1, to execute the corresponding software module in the animation video processing apparatus shown in FIG. 2. The following describes the operations shown in FIG. 5.

Operation 501: Determine a first motion vector corresponding to a current motion state of the target object based on the displacement parameter of the target object.

Operation 502: Determine a second motion vector corresponding to each key video frame based on the motion data set matching the target object.

Operation 503: Determine, according to the first motion vector, a second motion vector matching the first motion vector in a search binary tree structure corresponding to the second motion vector.

Operation 504: Determine a corresponding key video frame according to the second motion vector matching the first motion vector, and obtain the animation video matching the real-time motion state of the target object through the determined key video frame.

In some embodiments of the present disclosure, the determining, according to the first motion vector, a second motion vector matching the first motion vector in a search binary tree structure corresponding to the second motion vector may be implemented in the following manner:

when the first motion vector represents that a left lower limb of the target object is located in a corresponding horizontal plane, determining the second motion vector matching the first motion vector through a right lower limb search binary tree structure corresponding to the second motion vector; or when the first motion vector represents that a right lower limb of the target object is located in a corresponding horizontal plane, determining the second motion vector matching the first motion vector through a left lower limb search binary tree structure corresponding to the second motion vector.

In some embodiments of the present disclosure, the obtaining the animation video matching the real-time motion state of the target object through the determined key video frame may be implemented in the following manner:

determining, according to the key video frame, different animation videos to be output; and determining, in the different animation videos to be output, that an animation video to be output in which a limb drop point position of the target object has a minimum distance with a current limb drop point position of the target object is the animation video matching the real-time motion state of the target object.

In some embodiments of the present disclosure, the animation video processing method further includes:

obtaining target resolution corresponding to the animation video output environment; and performing resolution enhancement processing on the animation video matching the real-time motion state of the target object based on the target resolution, so that the animation video matching the real-time motion state of the target object matches the animation video output environment. Animation video output environments corresponding to the target object are different. Therefore, performing resolution enhancement processing on the animation video matching the real-time motion state of the target object can enable the user to view a motion state more suitable for the AI character, thereby improving user experience.

The animation video processing method provided in the embodiments of the present disclosure is described below by using a game scene with an AI character as an example. A client with software capable of displaying corresponding AI characters, such as clients or plug-ins of different games, is provided. A user can obtain the AI character, interact with a user-controlled character, and present the interaction through a corresponding client, and trigger a corresponding animation video processing process (for example, a virtual object can run or attack in a virtual environment) during virtual resource changes. A terminal is connected to a server through a network. The network may be a wide area network or a local area network, or a combination thereof, implementing data transmission through a radio link.

Figure 6:
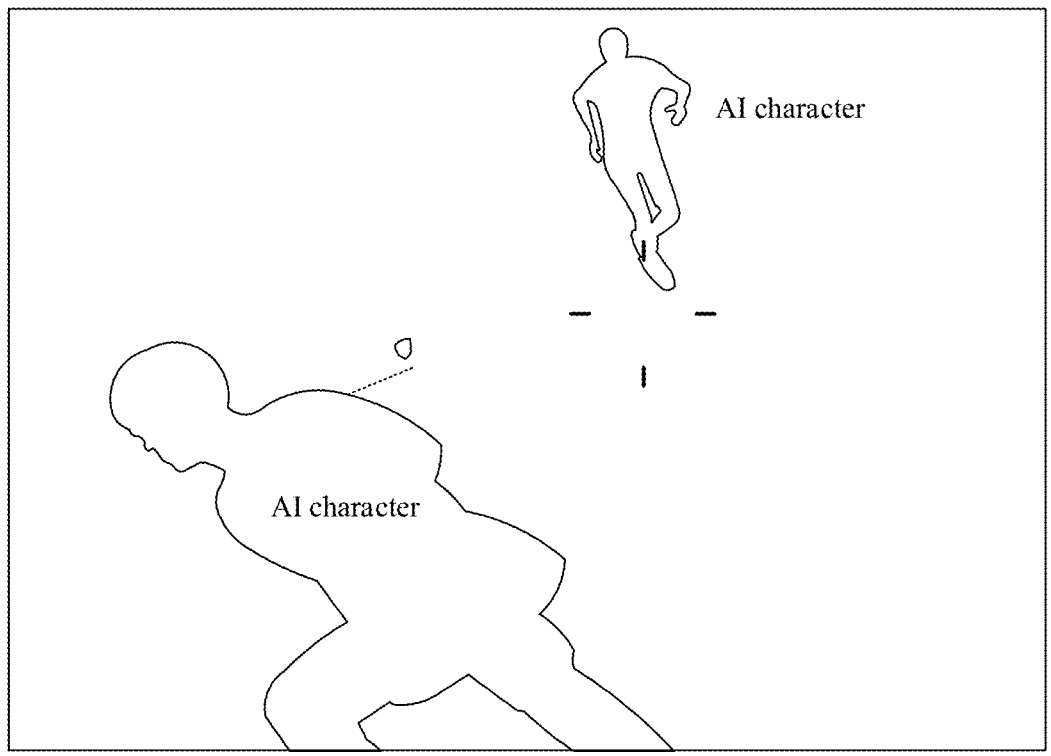
FIG. 6 is a schematic front-end display diagram of an animation video processing method according to an example embodiment of the present disclosure.
Figure 7:
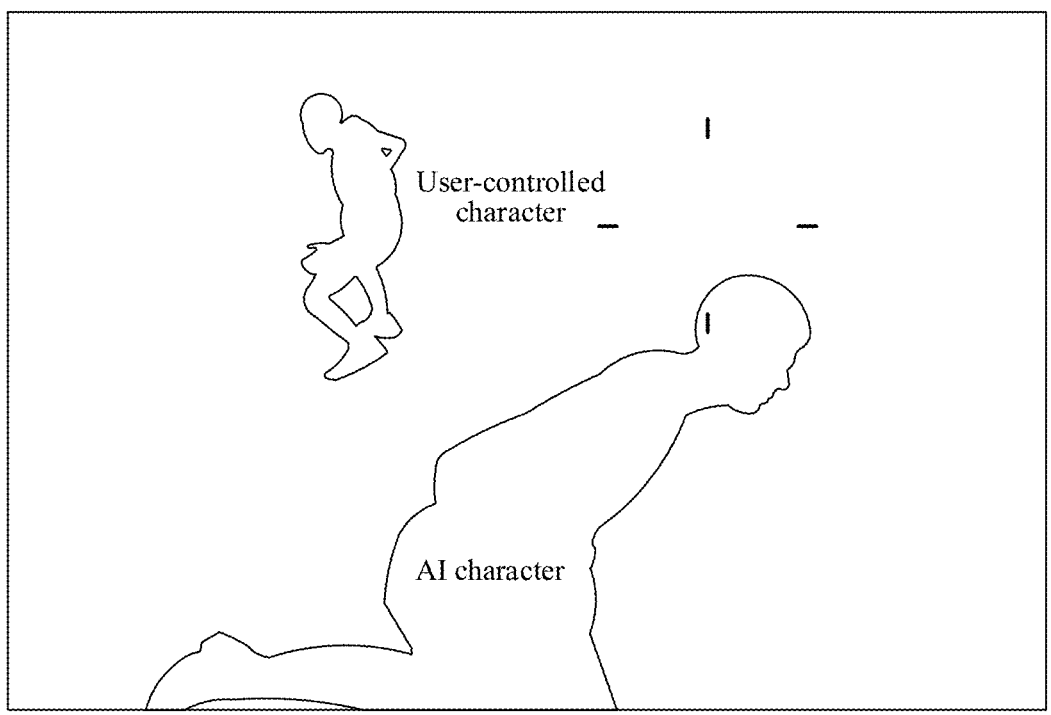
FIG. 7 is a schematic front-end display diagram of an animation video processing method according to an example embodiment of the present disclosure.

FIG. 6 is a schematic front-end display diagram of an animation video processing method according to an embodiment of the present disclosure. FIG. 7 is a schematic front-end display diagram of an animation video processing method according to an embodiment of the present disclosure. FIG. 6 and FIG. 7 respectively show vivid behaviors exhibited by a single AI character during a chase. To achieve such an effect with an animation state machine, a large quantity of state nodes are required. In a conventional solution, during processing of an AI character, an animation state machine is less scalable when facing complex motion behaviors. Similarly, in order to cover various motion behaviors of the character, a motion matching algorithm requires recording of a large amount of motion capture data as the data basis, so as to ensure that relatively close animation clips can be found regardless of the motion state. This process takes a large amount of system overheads.

Specifically, in terms of the animation state machine, in order to represent complex and highly realistic character animations, a large quantity of state nodes need to be defined in the state machine, and state transfer conditions between the nodes thus become extremely complex accordingly. As a result, the entire state machine becomes a complex mesh structure composed of a large quantity of state nodes and transfer conditions therebetween. This not only increases system overheads at runtime, but also makes it extremely difficult when faced with changes and state additions or deletions, resulting in very high maintenance costs. Similarly, in order to cover various motion behaviors of the character, the motion matching algorithm requires recording of a large amount of motion capture data as the data basis, so as to ensure that relatively close animation clips can be found regardless of the motion state. Therefore, the calculation process of selecting the best one from a huge amount of animation data at runtime leads to large performance overheads, making it conducive to large-scale use of AI characters and affecting user experience.

Figure 8:
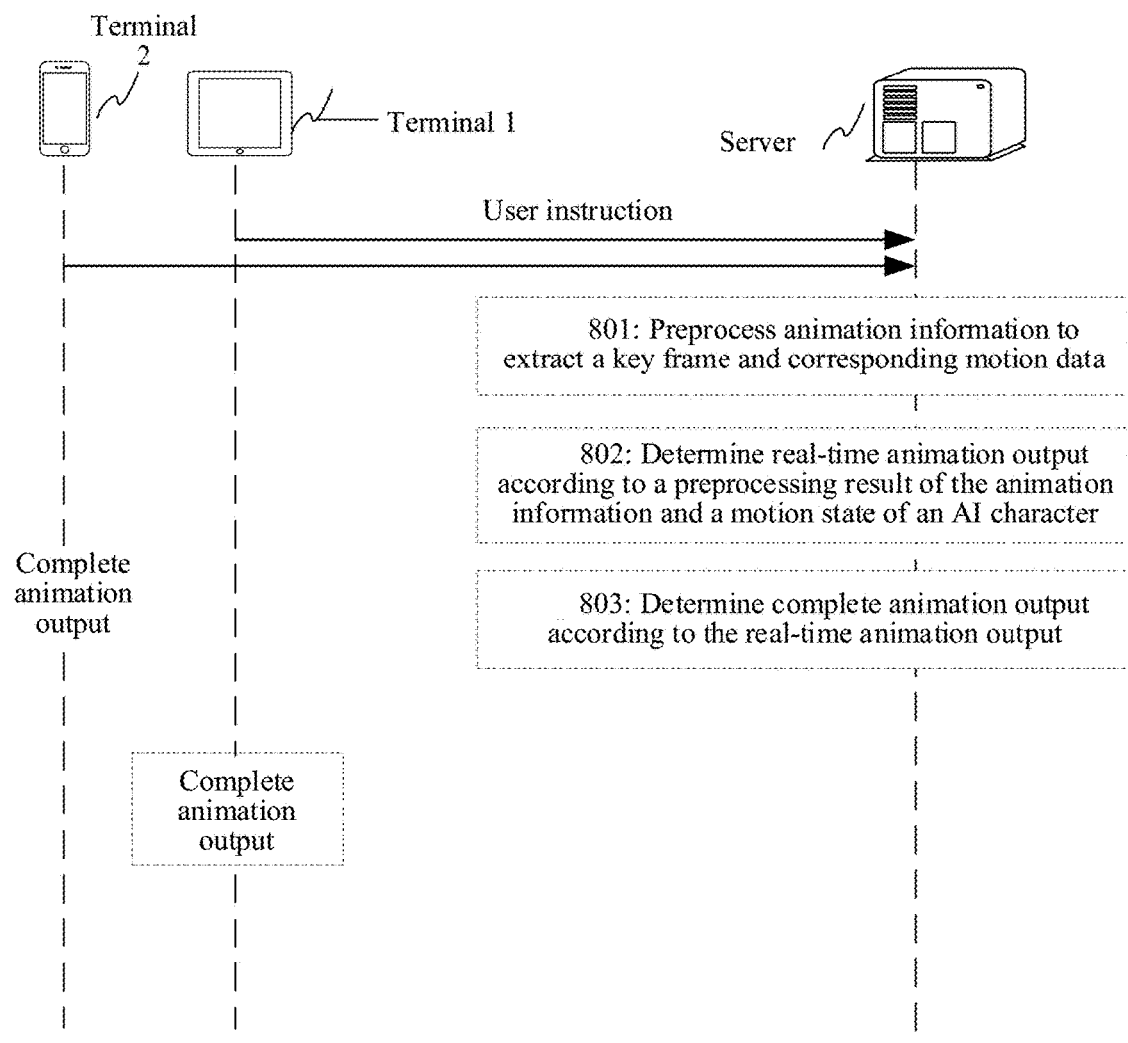
FIG. 8 is a schematic flowchart of an animation video processing method according to an example embodiment of the present disclosure.
Figure 9:
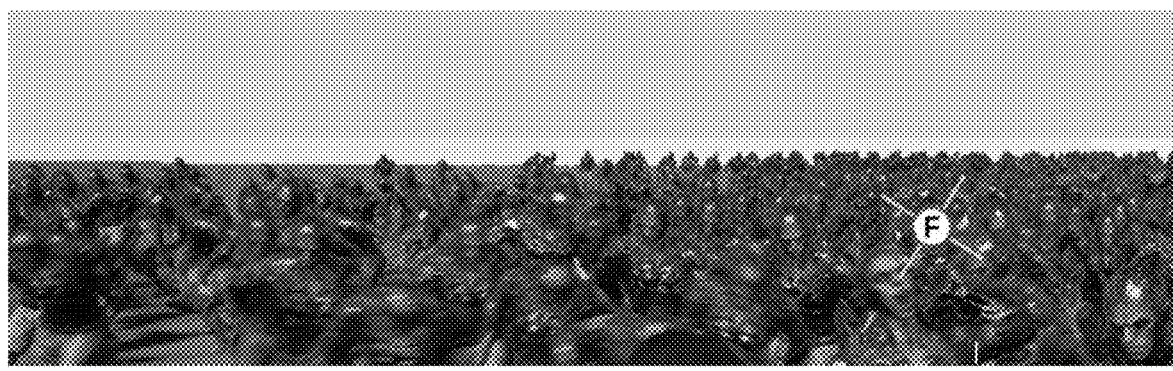
FIG. 9 is a schematic diagram of a display effect of an animation video processing method according to an example embodiment of the present disclosure.

FIG. 8 is a schematic flowchart of an animation video processing method according to an example embodiment of the present disclosure. FIG. 9 is a schematic diagram of a display effect of an animation video processing method according to an embodiment of the present disclosure. Specifically, to resolve the foregoing problem, an embodiment of the present disclosure provides an animation video processing method, including the following operations:

Operation 801: Preprocess animation information to extract a key frame and corresponding motion data.

Figure 10A:
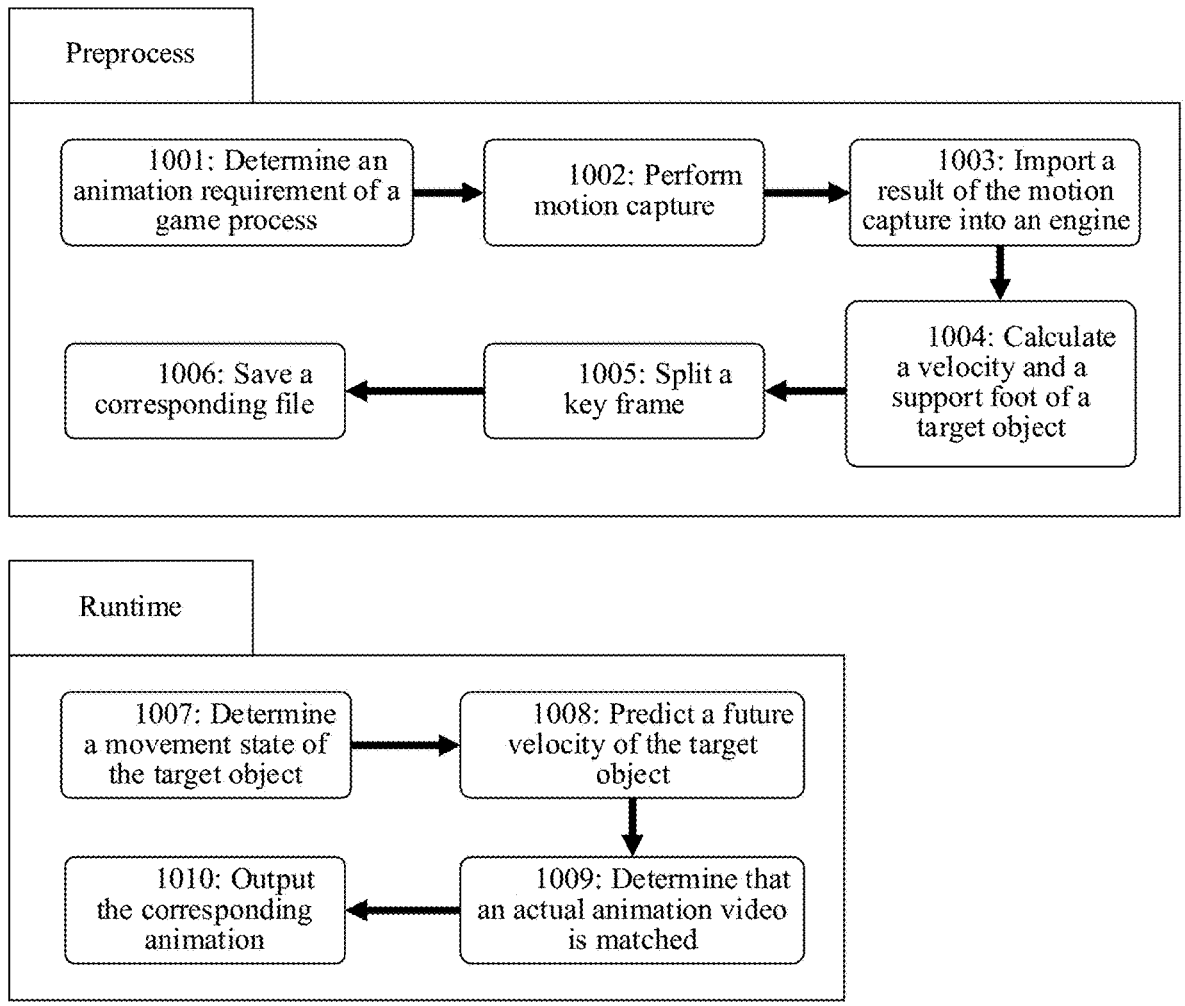
FIG. 10A is a schematic flowchart of an animation video processing method according to an example embodiment of the present disclosure.

FIG. 10A is a schematic flowchart of an animation video processing method according to an example embodiment of the present disclosure, including the following steps:

Operation 1001: Determine an animation requirement of a game process.
Operation 1002: Perform motion capture.
Operation 1003: Import a result of the motion capture into an engine.
Operation 1004: Calculate a velocity and a support foot of a target object.
Operation 1005: Split the key frame.
Operation 1006: Save a corresponding file.
Operation 1007: Determine a movement state of the target object.
Operation 1008: Predict a future velocity of the target object.
Operation 1009: Determine that an actual animation video is matched.
Operation 1010: Output the corresponding animation.

Data obtained through the motion capture is divided into small segments and imported into a game engine, and then further split into animation videos composed of smaller video frames after pre-calculation. The first frame of the animation video composed of each video frame is used as the key frame to extract the motion state, and then a KD Tree with left and right feet corresponding to each other is established. At runtime, an algorithm finds an animation video composed of N closest animation video frames from the KD Tree according to a motion state of a current character, that is, a six-dimensional vector composed of a current velocity, the predicted future velocity, and a past velocity, and finds an animation with two feet closest to positions of two feet of the current character as the final output. High-quality locomotion animations that match the system can be created using only very low computational overheads, with computational overheads of only 1 ms for 500 AI characters.

Figure 10B:
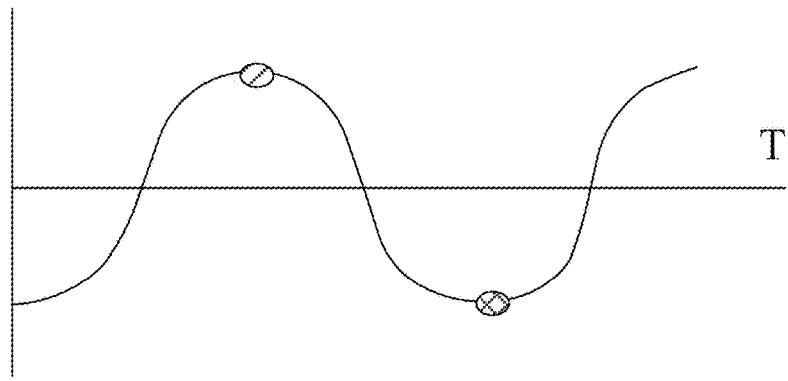
FIG. 10B is a schematic diagram of velocity difference of an animation video processing method according to an example embodiment of the present disclosure.
Figure 11:
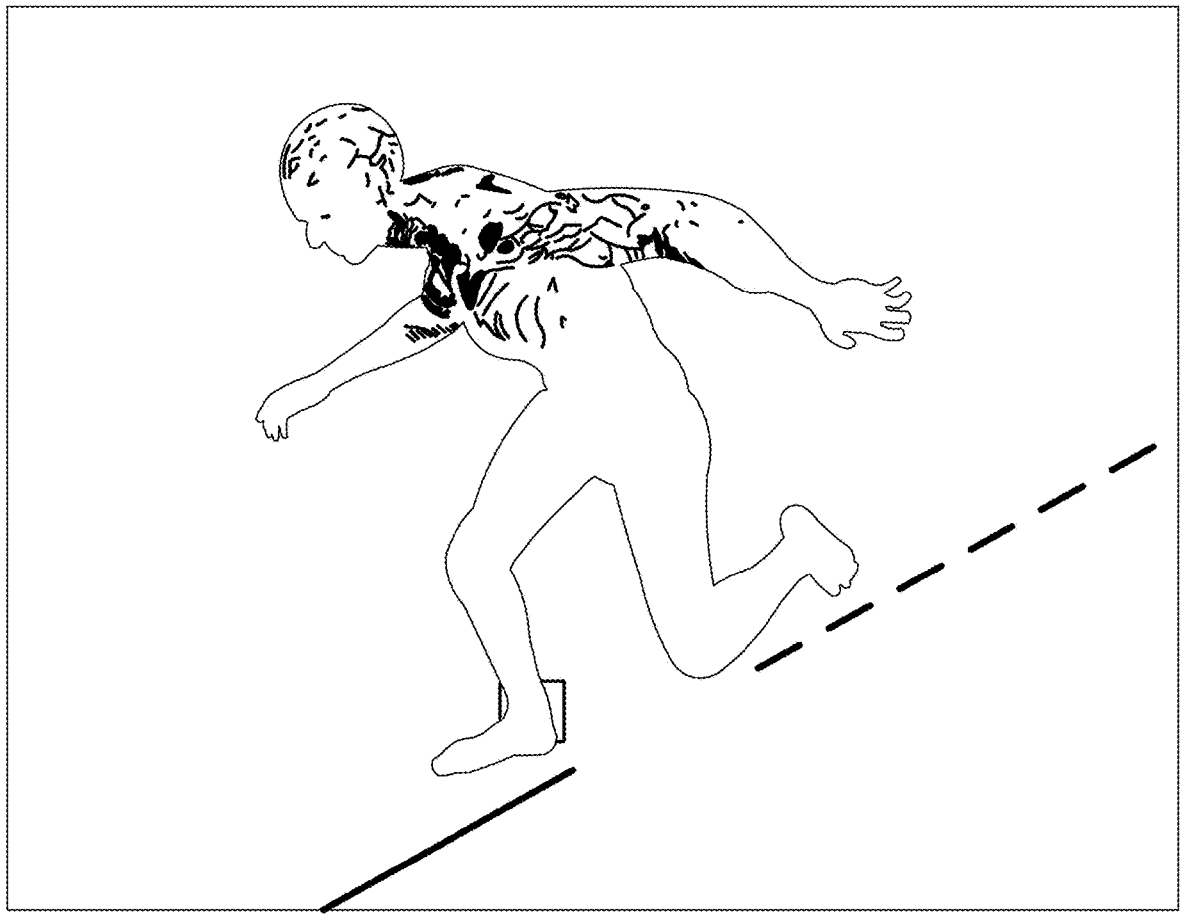
FIG. 11 is a schematic diagram of a display effect of an animation video processing method according to an example embodiment of the present disclosure.

FIG. 10B is a schematic of a velocity difference over time of an animation video processing method according to an example embodiment of the present disclosure. FIG. 11 is a schematic diagram of a display effect of an animation video processing method according to an example embodiment of the present disclosure. Specifically, the original motion matching algorithm completes the coverage of different motion behaviors of the character by using a huge amount of motion capture data. Motion behaviors of an AI character are simpler and more controllable than those of a user-controlled character. The user-controlled character may walk out of a complex motion track due to receipt of user-controlled input, while the AI character moves along a path calculated in advance according to a pathfinding algorithm, and a motion track generated by the pathfinding algorithm is generally a folded segment instead of an arc. Therefore, a motion pattern of the AI character is relatively simple and can be divided into animation videos composed of several video frames. Therefore, for AI characters, especially more than a particular quantity (for different usage scenarios, the quantity may be adjusted accordingly) of AI characters, there is no need to record huge and comprehensive motion capture data like for user characters. Instead, only key action clips need to be recorded, such as straight line walking or running cycle animations, start walking or start running animations in eight directions (forward and backward, left and right, front left, front right, back left, and back right), or turning animations or sudden stop animations in eight directions during running. These basic animation clips are sufficient to cover the motion state of the AI character during movement along the path generated by the pathfinding algorithm.

The foregoing motion capture clips may be recorded and imported into the game engine as required, and then the algorithm can preprocess these clips to extract key frames and motion data therefrom. The original motion matching algorithm samples all the animation data at a relatively high sampling frequency (a preferred value is ten times per second), obtains key frames through division, and calculate corresponding motion state data. Therefore, a quantity of key frames generated for the algorithm to perform dynamic matching is very large.

Further, in combination with a sync point mechanism in the animation state machine, the animation video processing method provided in the present disclosure can generate a key frame only when the left or right foot lands on the ground. This can greatly reduce the quantity of key frames used for the dynamic matching, thereby reducing computational overheads at runtime. In addition, because information about a current support foot is specified, a range of next matching can be reduced accordingly, and an unnatural phenomenon of the same foot continuously landing the ground twice can be avoided.

The key frame is calculated by using the support foot stepping on the ground as a reference. Specifically, the calculation is determined according to a velocity difference between two feet. A velocity of the left foot and a velocity of the right foot are defined as $V\_l$ and $V\_r$, respectively. In this case, a velocity difference $V\_rel=V\_l-V\_r$. During the movement of the game character, a velocity of a support foot drops to 0 after landing while the other foot has a positive velocity. Therefore, when the two feet alternately become the support foot, a velocity difference between the two fluctuates between a negative extreme and a positive extreme, as shown in FIG. 10B. When the velocity difference reaches the negative extreme, the velocity of the left foot on the ground is zero and the velocity of the right foot reaches the maximum in the cycle. Therefore, this time point can be defined as a time point at which the left foot is stepping on the ground. Similarly, when the velocity difference reaches the positive extreme, this time point is a time point at which the right foot is stepping on the ground. Therefore, a time point at which each of the two feet steps on the ground, that is, a time point of the key frame, can be quickly determined through the calculation of the velocity difference of the two feet. The time points split the animation clips into several animation videos composed of smaller video frames. The animation video composed of each video frame uses a start key frame as an index, and the algorithm extracts a current character velocity thereof, a character velocity after A seconds, a character velocity B seconds ago, and positions and velocities of the current left foot and right foot as key motion information, where A and B are used as configurable time parameters. The motion information is saved as a file for dynamic matching at runtime.

In some embodiments of the present disclosure, custom parameters can also be saved in a file for timely adaptation. For example, a start time and an end time for each animation clip imported after the motion capture to be used for generating key frames are specified, to prevent interfering animation frames from entering a matching pool. In addition, it is also possible to specify whether the clip is a looped clip and to tag the clip to enable other systems to control the animation system.

Operation 802: Determine real-time animation output according to a preprocessing result of the animation information and a motion state of an AI character.

Figure 12:
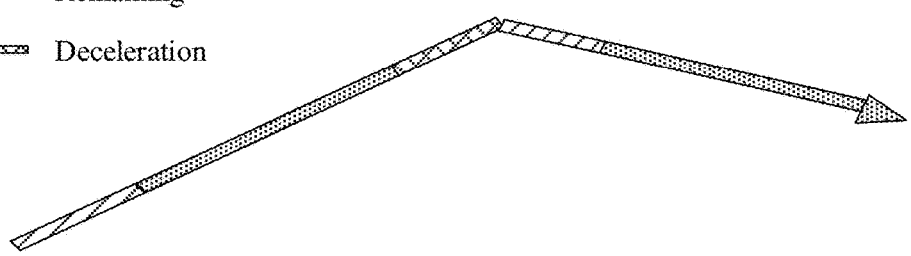
FIG. 12 is a schematic diagram of a processing process of an animation video processing method according to an example embodiment of the present disclosure.

FIG. 12 is a schematic diagram of a processing process of an animation video processing method according to an example embodiment of the present disclosure. Three key velocities, that is, a current velocity, a future velocity after A seconds, and a past velocity B seconds ago, can be selected as the main matching basis, and a velocity of a character in a vertical direction is ignored. Therefore, each velocity can actually be represented as a two-dimensional vector, that is, the current velocity (V_cur_x, V_cur_y), the future velocity (V_fur_x, V_fur_y), and the past velocity (V_pre_x, V_pre_y). The three velocity vectors are combined into a whole, that is, a six-dimensional vector V_char= (V_cur_x, V_cur_y, V_fur_x, V_fur_y, V_pre_x, V_pre_y) is used to describe a motion state of the character. Similarly, a six-dimensional motion vector V_anim to which each animation key frame belongs is also obtained through pre-calculation. The algorithm needs to find several V_anim closest to V_char among all animation key frames as candidates for the final output animation. For ease of calculation, proximity between two six-dimensional vectors can be measured directly by using a Euclidean distance.

Further, a future velocity of pre-calculated animation data can be obtained through subsequent animation calculation, but a future velocity of an AI character is unknown, thus the future velocity needs to be predicted by using a prediction algorithm. Because the AI character usually moves along a path obtained through calculation according to the pathfinding algorithm, the future velocity can be predicted based on the path along which the AI character moves. The prediction algorithm uses a maximum velocity V_max and maximum acceleration A_max of the movement of the character, as shown in FIG. 12. It is assumed that the character is accelerated to V_max at a current position, remains at the velocity for a period of time, and is then decelerated when approaching a path inflection point. The character is accelerated to V_max again after passing the inflection point. The time corresponding to each period (acceleration period, deceleration period, and full-speed period) can be calculated. Based on such a motion pattern, it can be obtained through calculation which part of the foregoing acceleration-deceleration-re-acceleration process the AI character is in after A seconds, and the predicted future velocity after A seconds can be calculated.

In addition, directly traversing all animation key frames leads to heavy computational overheads, which are the main overhead bottleneck of the conventional motion matching. In this solution, this step of calculation is accelerated by using a KD tree, that is, a KD tree is constructed in an initialization phase according to V_anim of all the animation key frames, and N nearest neighbors are found in the KD tree according to V_char at runtime. This greatly reduces the time required for matching and queries. It can be determined, from a result of the previous pre-calculation, whether a support foot in each animation key frame is a left foot or a right foot. Two KD trees are established for the left and right foot respectively during the establishment of the tree. A KD tree different from that of a current support foot is selected for matching and queries, that is, if the current support foot is the left foot, query is performed only in the KD tree corresponding to the right foot. This can ensure that in the final animation, the two feet alternately land on the ground, which conforms to the actual motion law of the game character. After an animation video composed of N candidate animation video frames closest to the current motion state is obtained, the algorithm selects an animation video composed of a video frame in which positions of two feet are closest to positions of two feet of the current character, as the corresponding real-time animation output.

Step 803: Determine complete animation output according to the real-time animation output.

In the technical solutions shown in the embodiments of the present disclosure, an original animation video matching a target object is determined, the original animation video being used for representing motion states of the target object in different usage scenarios; the original animation video is preprocessed to obtain a key video frame in the original animation video and motion data corresponding to the key video frame; a motion data set matching the target object is determined according to the motion data corresponding to the key video frame; a displacement parameter of the target object is determined based on a real-time motion state of the target object; and an animation video matching the real-time motion state of the target object is obtained based on the motion data set matching the target object and the displacement parameter of the target object. In this way, an animation video matching a real-time motion state of a target object can be accurately and efficiently obtained in an original animation video. Compared with the conventional technology, the present disclosure supports a much larger quantity of AI characters and much higher animation quality while ensuring that an information processing capability of an electronic device of a user remains unchanged, thereby effectively improving user experience.

The foregoing descriptions are merely embodiments of the present disclosure, but are not intended to limit the present disclosure. Any modification, equivalent replacement, or improvement made within the spirit and principle of the present disclosure shall fall within the protection scope of the present disclosure.

The embodiments of this application disclose an animation video processing method and apparatus, an electronic device, and a storage medium. An original animation video matching a target object may be determined, and the original animation video is preprocessed to obtain a key video frame in the original animation video and motion data corresponding to the key video frame; a motion data set matching the target object is determined; a displacement parameter of the target object is determined; and an animation video matching the real-time motion state of the target object is obtained based on the motion data set matching the target object and the displacement parameter of the target object. The present disclosure can accurately and efficiently obtain an animation video matching a real-time motion state of a target object in an original animation video. Compared with the conventional technology, the present disclosure supports a much larger quantity of AI characters and much higher animation quality while ensuring that an information processing capability of an electronic device of a user remains unchanged, thereby effectively improving user experience.

What is claimed is:

1. An animation video processing method, performed by an electronic device, the method comprising:
   determining an original animation video matching a target object, the original animation video being used for representing motion states of the target object in different usage scenarios;
   preprocessing the original animation video to obtain a key video frame in the original animation video and motion data corresponding to the key video frame;

determining, according to the motion data corresponding to the key video frame, a motion data set matching the target object;

determining a displacement parameter of the target object based on a real-time motion state of the target object; and obtaining an animation video matching the real-time motion state of the target object based on the motion data set matching the target object and the displacement parameter of the target object, wherein the determining a displacement parameter of the target object based on a real-time motion state of the target object comprises:

determining a movement path of the target object based on a pathfinding algorithm process;

determining a maximum displacement parameter matching the target object and a corresponding maximum plus displacement parameter according to the motion data set matching the target object; and determining displacement parameters of the target object at different moments according to the movement path of the target object, the maximum displacement parameter matching the target object, and the corresponding maximum plus displacement parameter.

2. The method according to claim 1, wherein the determining an original animation video matching a target object comprises:

determining an animation video output environment corresponding to the target object;

determining motion states of the target object in different usage scenarios according to the animation video output environment; and dynamically capturing motion actions of a captured object according to the motion states of the target object in different usage scenarios, to form the original animation video matching the target object.

3. The method according to claim 1, wherein the preprocessing comprises:

detecting limb drop point positions of the target object in all video frames in the original animation video;

determining that a video frame comprising the limb drop point positions of the target object is the key video frame when the limb drop point positions of the target object are located in a corresponding horizontal plane, or when the limb drop point positions of the target object are in contact with a corresponding reference object; and determining, based on the key video frame, that displacement parameters of the target object in different usage scenarios are used as the motion data corresponding to the key video frame.

4. The method according to claim 3, wherein the detecting limb drop point positions of the target object in all video frames in the original animation video comprises:

determining, when limbs of the target object are a left lower limb and a right lower limb of the target object, a velocity of the left lower limb of the target object and a velocity of the right lower limb of the target object; and determining, when a difference between the velocity of the left lower limb of the target object and the velocity of the right lower limb of the target object reaches a minimum value, that a position of the left lower limb of the target object is located in the corresponding horizontal plane; and determining, when the difference between the velocity of the left lower limb of the target object and the velocity of the right lower limb of the target object reaches a maximum value, that a position of the right lower limb of the target object is located in the corresponding horizontal plane.

5. The method according to claim 4 further comprising:

when the animation video output environment is an AI game environment, determining, when a difference between a velocity of a left foot and a velocity of a right foot of the target object reaches the minimum value, that a video frame in which the left foot of the target object has landed is the key video frame.

6. The method according to claim 3, wherein the detecting limb drop point positions of the target object in all video frames in the original animation video comprises:

determining, when limbs of the target object are a left upper limb and a right upper limb the target object, a velocity of the left upper limb of the target object and a velocity of the right upper limb of the target object; and determining, when a difference between the velocity of the left upper limb of the target object and the velocity of the right upper limb of the target object reaches a minimum value, that a position of the left upper limb of the target object is in contact with the corresponding reference object; or determining, when a difference between the velocity of the left upper limb of the target object and the velocity of the right upper limb of the target object reaches a maximum value, that a position of the right upper limb of the target object is in contact with the corresponding reference object.

7. The method according to claim 1, wherein the obtaining comprises:

determining a first motion vector corresponding to a current motion state of the target object based on the displacement parameter of the target object;

determining a second motion vector corresponding to each key video frame based on the motion data set matching the target object;

determining, according to the first motion vector, a second motion vector matching the first motion vector in a search binary tree structure corresponding to the second motion vector;

determining a corresponding key video frame according to the second motion vector matching the first motion vector; and obtaining the animation video matching the real-time motion state of the target object through the determined key video frame.

8. The method according to claim 7, wherein the determining, according to the first motion vector, a second motion vector matching the first motion vector in a search binary tree structure corresponding to the second motion vector comprises:

when the first motion vector represents that a left lower limb of the target object is located in a corresponding horizontal plane, determining the second motion vector matching the first motion vector through a right lower limb search binary tree structure corresponding to the second motion vector, or when the first motion vector represents that a right lower limb of the target object is located in a corresponding horizontal plane, determining the second motion vector matching the first motion vector through a left lower limb search binary tree structure corresponding to the second motion vector.

9. The method according to claim 8, wherein the obtaining the animation video matching the real-time motion state of the target object through the determined key video frame comprises:
- determining, according to the key video frame, different animation videos to be output; and
- determining, in the different animation videos to be output, that an animation video to be output in which a limb drop point position of the target object has a minimum distance with a current limb drop point position of the target object is the animation video matching the real-time motion state of the target object.

10. The method according to claim 1 further comprising:
- obtaining target resolution corresponding to the animation video output environment; and
- performing resolution enhancement processing on the animation video matching the real-time motion state of the target object based on the target resolution, so that the animation video matching the real-time motion state of the target object matches the animation video output environment.

11. An animation video processing apparatus, comprising:
- at least one memory configured to store computer program code;
at least one processor configured to read the program code and operate as instructed by the program code, the program code comprising:
- information transmission code configured to cause the at least one processor to determine an original animation video matching a target object, the original animation video being used for representing motion states of the target object in different usage scenarios; and
- information processing code configured to cause the at least one processor to:
- preprocess the original animation video to obtain a key video frame in the original animation video and motion data corresponding to the key video frame;
- determine, according to the motion data corresponding to the key video frame, a motion data set matching the target object;
- determine a displacement parameter of the target object based on a real-time motion state of the target object; and
- obtain an animation video matching the real-time motion state of the target object based on the motion data set matching the target object and the displacement parameter of the target object,
- wherein the determine a displacement parameter of the target object based on a real-time motion state of the target object comprises:
- determining a movement path of the target object based on a pathfinding algorithm process;
- determining a maximum displacement parameter matching the target object and a corresponding maximum plus displacement parameter according to the motion data set matching the target object; and
- determining displacement parameters of the target object at different moments according to the movement path of the target object, the maximum displacement parameter matching the target object, and the corresponding maximum plus displacement parameter.

12. The apparatus according to claim 11, wherein the information processing code is further configured to cause the at least one processor to
- determine an animation video output environment corresponding to the target object;
- determine motion states of the target object in different usage scenarios according to the animation video output environment; and
- dynamically capture motion actions of a captured object according to the motion states of the target object in different usage scenarios, to form the original animation video matching the target object.

13. The apparatus according to claim 11, wherein the information processing code is further configured to cause the at least one processor to
- detect limb drop point positions of the target object in all video frames in the original animation video;
- determine, when the limb drop point positions of the target object are located in a corresponding horizontal plane, or are in contact with a corresponding reference object, that a video frame comprising the limb drop point positions of the target object is the key video frame; and
- determine, based on the key video frame, that displacement parameters of the target object in different usage scenarios are used as the motion data corresponding to the key video frame.

14. The apparatus according to claim 13, wherein the detect limb drop point positions of the target object in all video frames in the original animation video comprises:
- determining, when limbs of the target object are a left lower limb and a right lower limb of the target object, a velocity of the left lower limb of the target object and a velocity of the right lower limb of the target object;
- determining, when a difference between the velocity of the left lower limb of the target object and the velocity of the right lower limb of the target object reaches a minimum value, that a position of the left lower limb of the target object is located in the corresponding horizontal plane; and
- determining, when the difference between the velocity of the left lower limb of the target object and the velocity of the right lower limb of the target object reaches a maximum value, that a position of the right lower limb of the target object is located in the corresponding horizontal plane.

15. The apparatus according to claim 14, wherein the at least one processor is further configured to
- when the animation video output environment is an AI game environment,
- determine, when a difference between a velocity of a left foot and a velocity of a right foot of the target object reaches the minimum value, that a video frame in which the left foot of the target object has landed is the key video frame.

16. The apparatus according to claim 13, wherein the detect limb drop point positions of the target object in all video frames in the original animation video comprises:
- determining, when limbs of the target object are a left upper limb and a right upper limb the target object, a velocity of the left upper limb of the target object and a velocity of the right upper limb of the target object; and
- determining, when a difference between the velocity of the left upper limb of the target object and the velocity of the right upper limb of the target object reaches a minimum value, that a position of the left upper limb of the target object is in contact with the corresponding reference object; or
- determining, when a difference between the velocity of the left upper limb of the target object and the velocity of the right upper limb of the target object reaches a maximum value, that a position of the right upper limb of the target object is in contact with the corresponding reference object.

17. The apparatus according to claim 11, wherein the obtain an animation video comprises:
   determining a first motion vector corresponding to a current motion state of the target object based on the displacement parameter of the target object;
   determining a second motion vector corresponding to each key video frame based on the motion data set matching the target object;
   determining, according to the first motion vector, a second motion vector matching the first motion vector in a search binary tree structure corresponding to the second motion vector;
   determining a corresponding key video frame according to the second motion vector matching the first motion vector; and
   obtaining the animation video matching the real-time motion state of the target object through the determined key video frame.

18. A non-transitory computer-readable storage medium, storing executable code, that when executed by at least one processor causes the at least one processor to:
   determine an original animation video matching a target object, the original animation video being used for representing motion states of the target object in different usage scenarios;
   preprocess the original animation video to obtain a key video frame in the original animation video and motion data corresponding to the key video frame;
   determine, according to the motion data corresponding to the key video frame, a motion data set matching the target object;
   determine a displacement parameter of the target object based on a real-time motion state of the target object; and
   obtain an animation video matching the real-time motion state of the target object based on the motion data set matching the target object and the displacement parameter of the target object,
wherein the determine a displacement parameter of the target object based on a real-time motion state of the target object comprises:
   determining a movement path of the target object based on a pathfinding algorithm process;
   determining a maximum displacement parameter matching the target object and a corresponding maximum plus displacement parameter according to the motion data set matching the target object; and
   determining displacement parameters of the target object at different moments according to the movement path of the target object, the maximum displacement parameter matching the target object, and the corresponding maximum plus displacement parameter.

* * * * *